United States Patent
Rittger et al.

(10) Patent No.: US 9,792,785 B2
(45) Date of Patent: Oct. 17, 2017

(54) DISPLAY STRATEGY FOR A PARKING ASSISTANCE FOR A MOTOR VEHICLE

(71) Applicant: GM GLOBAL TECHNOLOGY OPERATIONS LLC, Detroit, MI (US)

(72) Inventors: Lena Rittger, Elsenfeld (DE); Gerald Schmidt, Frankfurt am Main (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 63 days.

(21) Appl. No.: 14/947,535

(22) Filed: Nov. 20, 2015

(65) Prior Publication Data
US 2016/0144895 A1 May 26, 2016

(30) Foreign Application Priority Data
Nov. 22, 2014 (DE) .................. 10 2014 017 323

(51) Int. Cl.
| G08B 5/36 | (2006.01) |
| B60Q 9/00 | (2006.01) |
| G08G 1/16 | (2006.01) |

(52) U.S. Cl.
CPC .............. *G08B 5/36* (2013.01); *B60Q 9/002* (2013.01); *B60Q 9/006* (2013.01); *B60Q 9/007* (2013.01); *G08G 1/165* (2013.01); *G08G 1/168* (2013.01)

(58) Field of Classification Search
CPC . G08B 5/36; G08G 1/16; G08G 1/165; G08G 1/168; B60Q 9/002; B60Q 9/006; B60Q 9/007
See application file for complete search history.

(56) References Cited

U.S. PATENT DOCUMENTS

| 2007/0182677 A1* | 8/2007 | Lee .................... H05B 33/0803 345/82 |
| 2012/0188101 A1* | 7/2012 | Ganot .................... G07B 15/02 340/932.2 |
| 2013/0158851 A1* | 6/2013 | Herrmann .............. G08G 1/168 701/300 |

FOREIGN PATENT DOCUMENTS

| DE | 102007057725 A1 | 6/2008 |
| DE | 102011101708 A1 | 11/2012 |
| DE | 102012008660 A1 | 11/2012 |
| EP | 1531082 B1 | 4/2008 |
| WO | 2012084123 A2 | 6/2012 |

OTHER PUBLICATIONS

German Patent Office, German Search Report for German Application No. 102014017323.2, dated Sep. 15, 2015.

* cited by examiner

*Primary Examiner* — Dale W Hilgendorf
(74) *Attorney, Agent, or Firm* — Lorenz & Kopf LLP

(57) ABSTRACT

A vehicle parking assistant system which detects and displays a true distance of an object from the vehicle is disclosed. The system includes several vertically stacked LEDs integrated in a window pane of the vehicle. At least one sensor detects the distance between the motor vehicle and an object at a distance from the motor vehicle. A control unit is connected to the sensor and the LEDs. Each of the LEDs has a threshold value of the distance of the object assigned to it, and the control unit is configured to hold each of the LEDs in an inactive state while the distance exceeds the associated threshold value, and to activate the LEDs when the distance drops below the associated threshold value.

9 Claims, 2 Drawing Sheets

DISPLAY STRATEGY FOR A PARKING ASSISTANCE FOR A MOTOR VEHICLE

CROSS-REFERENCE TO RELATED APPLICATION

This application on claims priority to German Patent Application No. 102014017323.2, filed Nov. 22, 2014, which is incorporated herein by reference in its entirety.

TECHNICAL FIELD

The present disclosure pertains to a parking assistant for a motor vehicle, and more particularly to system which detects and displays a true distance of an object from the vehicle.

BACKGROUND

Parking assistants adapted for a vehicle that, on a display in preferably the center console of the vehicle, indicate the distance to an object such as a vehicle or an object in front of or behind the vehicle, are known and have been disclosed in various forms.

For example, DE 103 52 506 A1 describes a process for displaying the distance of a vehicle to an object in front of or behind a vehicle while parking. Both the vehicle and the object are shown to scale in a top view on a display, thus enabling the driver of the vehicle to estimate the distance to the object in relation to the dimensions of the vehicle. A defined border area around the object is highlighted in color.

If during parking the driver becomes aware of an object in the space around the vehicle, he or she generally looks at the object as it approaches, but the driver is unable to precisely see that part of the object, which would collide with the vehicle if he or she were to approach it further. In order to be able to estimate the distance to an invisible portion of the object that is not within the field of view, the driver must look at the display and is unable, during that time, to directly monitor the environment of the vehicle.

SUMMARY

In accordance with the present disclosure, a parking assistant and an operating method for it, is provided which enable the driver of the vehicle to detect the true distance of an object from the vehicle without having to divert his eyes from the environment of the vehicle.

According to one embodiment of the present disclosure, a parking assistant for motor vehicle includes several vertically staggered light emitting diodes (LEDs) integrated with a window pane. Each of the LEDs has a threshold value of the distance of the object assigned to it. At least one sensor detects the distance between the motor vehicle and an object at a distance from the motor vehicle. A control unit is connected to the sensor and adapted to hold each of the LEDs in an inactive state while the distance to its associated threshold value is exceeded, and to activate the LED when the distance drops below the associated threshold value.

When looking through the window pane onto the object a driver can, at the same time, see the LEDs integrated in the window. When approaching an object the driver can estimate the distance to the object when the distance drops below the threshold value by means of the activated LEDs without having to divert his eyes away from the object. The LEDs whose associated distance threshold value remains exceeded remain inactive thus not irritating the driver.

Each LED may be part of a row of several rows of LEDs extending one above the other. In this way, independently of the position of the object relative to the vehicle, LEDs can be activated which are lying within the field of vision between the driver and the object.

In the simplest case, if the distance drops below the associated threshold value, all LEDs of one row can be activated; it can thus be assumed that there is at least one among the activated LEDs, which is between the driver and the object and is directly perceived by him, when his eyes are directed at the object.

Alternatively activation of LEDs in one row may be carried out selectively in that exactly the one or more LEDs of one row are activated, which lie in viewing direction of the driver in front of the object. In this way the driver can be specifically alerted to the position of an object which may not have otherwise been noticed.

In particular, attention may be drawn to an object lying in front of the vehicle by activating the LEDs in the front window pane in front of the driver, whilst attention is drawn to an object lying in front of a mudguard by activating LEDs in the vicinity of the respective lateral edge of the front window pane or in the side window.

The number of activated LEDs adjacent to each other in a row can depend on the width of the object. Showing the width of the object makes it easier for a driver to identify the object triggering the hint.

The rows of LEDs may have different colors. LEDs which have a large distance threshold value from the object assigned thereto may be given a color not associated with an urgent or critical state. LEDs which have a small distance threshold value assigned thereto may be given a warning color such as red or orange.

At least the LED associated with the smallest distance threshold value, if the distance drops below a warning value which lies below the smallest threshold value, may be configured to flash. This may be used to highlight the fact that if the object is approached further, a collision with the object is imminent.

The rows of LEDs may extend along the lower edge of the window pane. Since during the parking maneuver interfering objects are normally in the lower area of the driver's field of vision, the driver will preferably be looking in a downward direction through the window pane and thus has the LEDs directly in his line of sight.

When the LEDs are arranged along the lower edge of the window pane, the LEDs do not normally, from the driver's perspective, overlap with the visible part of the object but with a part of the vehicle covering the invisible part of the object, in particular a bonnet, so that the perception of the area of the environment not covered by the vehicle is not adversely affected by an activation of the LEDs.

Activation of the LEDs, as the distance to the object diminishes, may progress from an edge of the window pane to the center. This will enhance a subjective impression of the approach to the object.

The requirement is further met by a method for operating a parking assistant for a motor vehicle with several vertically stacked LEDs. The distance between the motor vehicle and an object at a distance from the motor vehicle is ascertained. The LEDs when the distance drops below an associated threshold value are activated. The LEDs in an inactive state are held as such for as long as the distance exceeds the associated threshold value.

Further subjects of the present disclosure include a computer program product including instructions which when executed enable a computer to operate as a control unit in a parking assistant as described above or to execute the above-described method, and a computer-readable data carrier on which program instructions have been recorded which enable a computer to operate as a control unit in a parking assistant as described above or to execute the above-described method. Likewise, a device or means for operating a parking assistant for a motor vehicle with several vertically stacked LEDs may include means for ascertaining the distance between the motor vehicle and an object at a distance from the motor vehicle, means for activating the LEDs when the distance drops below an associated threshold value, and means for holding the LEDs in an inactive state as long as the distance exceeds the associated threshold value.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the invention. Furthermore, there is no intention to be bound by any theory presented in the preceding background of the invention or the following detailed description.

Figure 1:
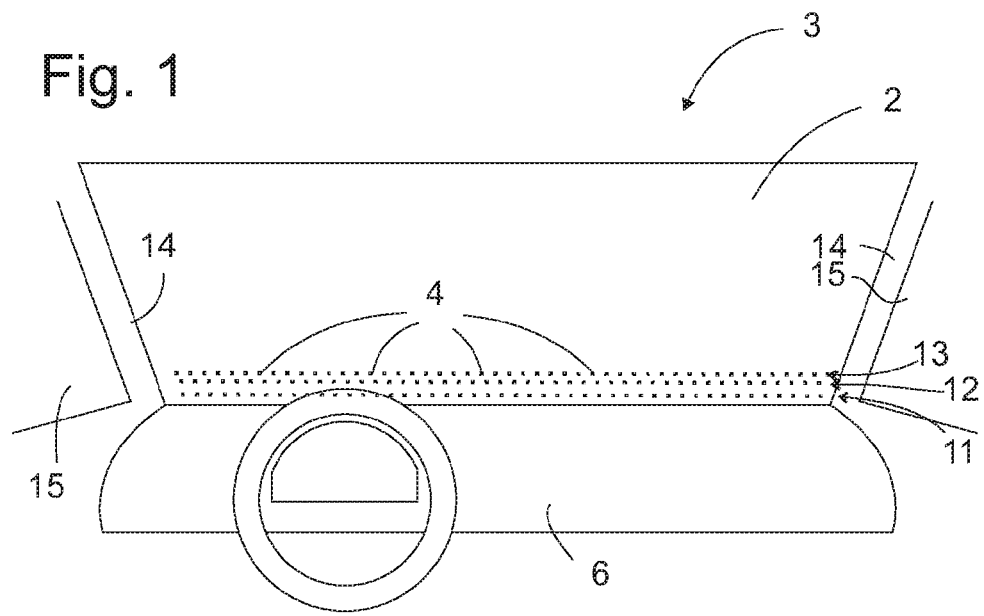
FIG. 1 shows a schematic view of the front windscreen and dashboard of a motor vehicle equipped with a parking assistant according to the present disclosure.

FIG. 1 shows a perspective view of a dashboard 6 and a front windscreen 2 of the motor vehicle 3 from the perspective of a driver 1. The rows 11, 12, 13 of LEDs 4 extend along the lower edge of the windscreen 2 across its entire width. The rows 11, 12, 13, if desired, may reach beyond the borders of the windscreen 2 and extend across A-columns 14, possibly as far as into side window panes 15. The LEDs 4 are integrated with the windscreen 2 in such a way as not to adversely affect the planarity of the surfaces. The LEDs 4 may be enclosed between glass layers of the windscreen 2 or glued onto the windscreen 2 and coated with a crystal clear protective coating in such a way that they are not damaged when the windscreen is cleaned. The rows 11, 12, 13 are positioned along the lower edge of the windscreen 2 so as to be recognizable by a driver 1 independently of his size and sitting position and so that a bonnet (not shown here) of the vehicle, from the perspective of a normal size driver, lies in front of him.

Figure 2:
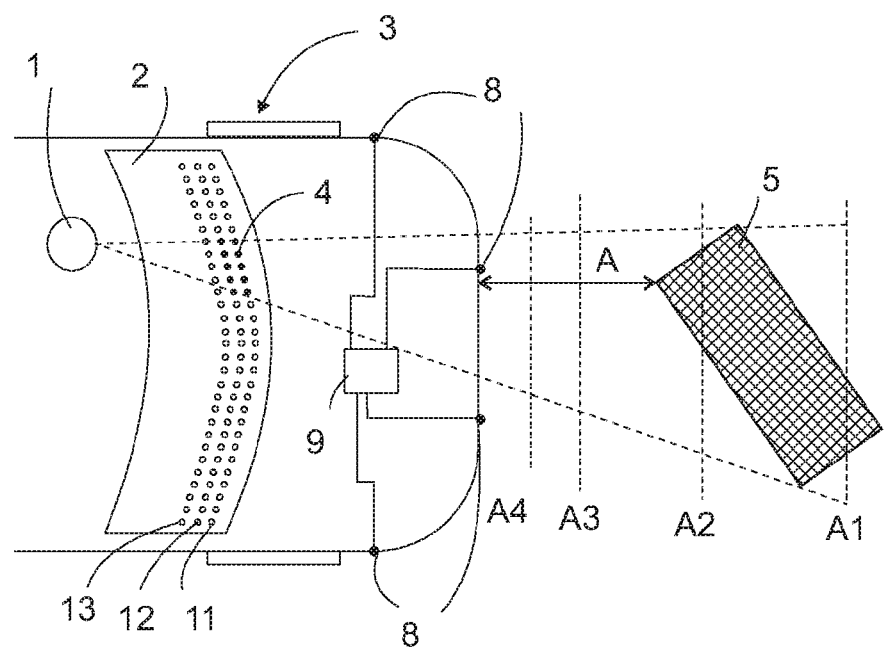
FIG. 2 shows a schematic top view of the motor vehicle with a parking assistant and the environment thereof.

FIG. 2 schematically shows a top view of the front part of the vehicle 3 with the parking assistant. Several sensors 8, for example radar or ultrasound sensors, are mounted to the front of the vehicle 3 for monitoring the space extending in front of the vehicle. A control unit 9 is connected to the sensors 8. Further sensors, which may be of the same type as the sensors 8, may be arranged on the flanks of the vehicle, for example on the external mirrors, and connected to the control unit 9 for monitoring areas laterally of the vehicle 3. The control unit 9 decides by means of the signals supplied by the sensors 8, whether an object 5 is present in the space around the vehicle 3 monitored by the sensors 8, what distance to the vehicle 3 the object 3 may possibly have and in which direction it lies seen from the driver's 1 point of view. The control unit 9 has threshold values A1, A2, A3 of the object 5 assigned to it. Each of the rows 11, 12, 13 of LEDs 4 connected to the control unit 9 has one of these threshold values assigned to it. Row 11, which lies nearest the lower edge of the windscreen, has the largest threshold value A1 assigned to it. Row 12 has the threshold value A2 and row 13 has the threshold value A3 assigned to it.

If the control unit 9 decides that the distance A between the vehicle 3 and the object 5 has dropped below the threshold value A1, it activates those LEDs 4 of row 11 which seen from the driver' 1 point of view lie between him and the object 5. These LEDs 4 are then activated by the control unit 9 in order to draw the driver's attention to the object 5. The active LEDs 4 are shown in FIG. 2 as filled dots. The other LEDs 4 are held in an inactive state so that they are virtually invisible to the driver 1. The distance A between the vehicle 3 and the object 5 in FIG. 2 also drops below the threshold value A2 causing the LEDs 4 of row 12 between driver 1 and object 5 to also be activated. The LEDs of row 13 remain inactive.

Figure 3:
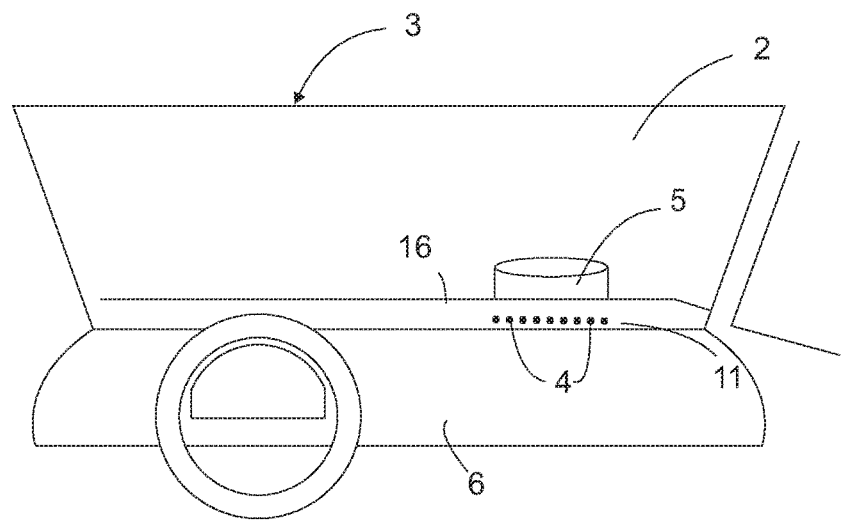
FIG. 3 shows a phase of an application situation of the parking assistant.

FIG. 3 shows an application situation from the perspective of driver 1 in FIG. 1. Beyond the bonnet 16 an object 5 is present, as for example a bollard or a refuse bin. The distance from the object 5 drops below the threshold value A1. The control unit 9 has decided, which of the LEDs 4 of the associated row 11 lie, from the driver's 1 point of view, between the driver and the object 5 and has activated these. The LEDs 4 shine green because the object at a distance A1 does not yet represent an immediate danger. The other LEDs are not visible because they are held inactive by the control unit 9.

Figure 4:
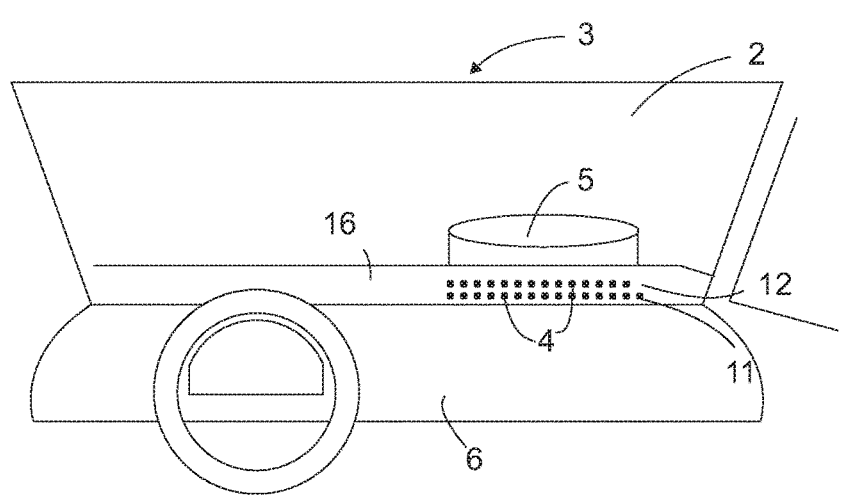
FIG. 4 show a different phase of an application situation of the parking assistant from that illustrated in FIG. 3.

FIG. 4 shows the situation following a further approach. The distance of the object 5 now drops below the threshold value A2. The control unit 9 has decided, which of the LEDs 4 of the associated row 12 lay between the driver and the object 5 as seen from the point of view of the driver 1, and has activated these as well. These LEDs 4 shine yellow in order to signal increased danger compared to the situation in FIG. 3. Simultaneously the number of LEDs 4 of row 11, which lies between the driver 1 and the object 5, has also increased compared to FIG. 3.

Figure 5:
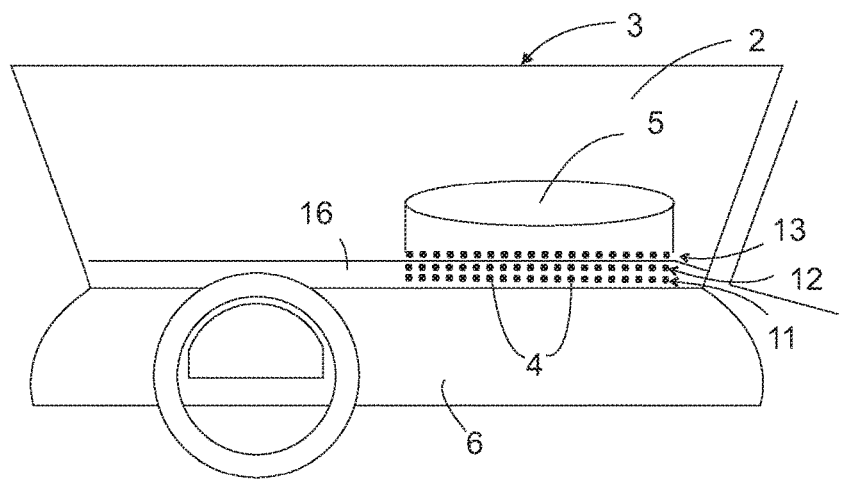
FIG. 5 shows yet another phase of an application situation of the parking assistant from that illustrated in FIG. 3 or 4.

FIG. 5 shows the situation, where a further approach would shortly lead to a collision with the object 5. The object 5 now drops below even the threshold value A3, so that the red LEDs of row 13 between the driver 1 and the object 5 are now also lit.

As a warning value A4 drops below the distance, which lies below the threshold value A3, the LEDs 4 of row 13 begin to flash. This is to indicate that with any further approach a collision with the object 5 is imminent. Alternately, the control unit 9 may be adapted to cause all activated LEDs 4 of rows 11, 12, 13 to flash as the threshold value drops below the distance A4.

As can be recognized from FIGS. 3 to 5, the number of activated LEDs 4 depends on the width of the object 5 as seen from the driver's 1 perspective. The position of the activated LEDs 4 within in a row depends on the direction, in which the object 5 lies as seen by the driver 1. Therefore the width and the position of the object 5 can be detected intuitively by the driver 1. Since the activated LEDs 4 seen from the driver's 1 point of view, always lie between him and the object 5, he can simultaneously keep the approaching object 5 and the LEDs in his field of vision.

Sensors 11 may be mounted both at the rear and at the front of vehicle 3, which are likewise connected to the control unit 9. In the some way as with the front windscreen 2 rows of LEDs may be integrated with the rear windscreen, which are activated by the control unit 9 in the same way as the LEDs 4 in the front windscreen 2.

In order to keep optical interferences between the rows 11, 12, 13, which are caused by the electrical connections between the LEDs 4 and the control unit 9, to a minimum, a transparent conductor foil may be used for the connections, which are integrated with the windscreen 2. This also applies to the LEDs 4 which may be integrated in the rear windscreen or in the side windows.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A parking assistant for a motor vehicle having a window pane, the parking assistant comprising:
    a plurality of light emitting diodes (LEDs) arranged in a vertically stacked orientation and integrated in the window pane, each LED occupying a horizontal position in one of a plurality of LED rows, one row extending above another row;
    at least one sensor configured to detect a distance between the motor vehicle and an object adjacent the motor vehicle and generate a distance signal; and
    a control unit configured to receive the distance signal from the at least one sensor and to selectively switch the plurality of LEDs between an inactive state and an active state;
    wherein each of the LEDs has a threshold value associated with the distance signal assigned thereto it, and the control unit is adapted to hold each of the LEDs in the inactive state while the distance signal exceeds the associated threshold value, and to switch the LED to the active state when the distance signal drops below the associated threshold value, and
    wherein a number of activated LEDs adjacent to each other in the row depends on a width of the object.

2. The parking assistant according to claim 1, where the horizontal position of an activated LED depends on a horizontal position of the object relative to the vehicle.

3. The parking assistant according to claim 1, where the plurality of LED rows comprises LEDs having different colors.

4. The parking assistant according to claim 1, where the plurality of LED rows extend along a lower edge of the window pane.

5. The parking assistant according to claim 1, wherein an LED associated with a smallest distance threshold value that is less than the other distance thresholds flashes when a warning value drops below a smallest distance associated with the smallest distance threshold value.

6. The parking assistant according to claim 1, wherein an activation of the LEDs progresses from an edge of the window pane to the middle as the distance to the object decreases.

7. A method for operating a parking assistant for a motor vehicle:
    assigning an associated threshold value to each of a plurality of light emitting diodes (LEDs) arranged in a vertically stacked orientation and integrated in a window pane, each LED occupying a horizontal position in one of a plurality of LED rows, one row extending above another row;
    ascertaining a distance between the motor vehicle and an object at the distance from the motor vehicle;
    activating at least one of the plurality of LEDs when the distance drops below the associated threshold value, a number of activated LEDs adjacent to each other in the row depending on a width of the object; and
    deactivating at least one of the plurality of LEDs when the distance exceeds the associated threshold value.

8. A non-transitory computer-readable medium comprising a program instruction recorded thereon which enable a computer to execute the steps of:
    assigning an associated threshold value to each of a plurality of light emitting diodes (LEDs) arranged in a vertically stacked orientation and integrated in a window pane, each LED occupying a horizontal position in one of a plurality of LED rows, one row extending above another row;
    ascertaining a distance between the motor vehicle and an object at the distance from the motor vehicle;
    activating at least one of the plurality of LEDs when the distance drops below the associated threshold value, a number of activated LEDs adjacent to each other in the row depending on a width of the object; and
    deactivating at least one of the plurality of LEDs when the distance exceeds the associated threshold value.

9. The non-transitory computer-readable medium according to claim 8, further comprising:
    a control unit; and
    a computer program product.

* * * * *